United States Patent
Nakagawa et al.

(10) Patent No.: US 8,866,422 B2
(45) Date of Patent: Oct. 21, 2014

(54) AIRCRAFT MOTOR DRIVE CONTROL APPARATUS

(71) Applicant: NABTESCO Corporation, Tokyo (JP)

(72) Inventors: Shingo Nakagawa, Gifu (JP); Atsushi Mori, Gifu (JP)

(73) Assignee: NABTESCO Corporation, Tokyo (JP)

( * ) Notice: Subject to any disclaimer, the term of this patent is extended or adjusted under 35 U.S.C. 154(b) by 94 days.

(21) Appl. No.: 13/741,050

(22) Filed: Jan. 14, 2013

(65) Prior Publication Data
US 2013/0187577 A1 Jul. 25, 2013

(30) Foreign Application Priority Data

Jan. 19, 2012 (JP) .................. 2012-008607

(51) Int. Cl.
*H02P 6/08* (2006.01)
*H02P 6/14* (2006.01)

(52) U.S. Cl.
USPC ............. 318/400.1; 318/400.02; 318/599; 318/721; 318/801; 318/811

(58) Field of Classification Search
USPC .......... 318/721, 801, 599, 811, 400.02, 400.1
See application file for complete search history.

(56) References Cited

U.S. PATENT DOCUMENTS

| | | | | |
|---|---|---|---|---|
| 5,541,488 A | * | 7/1996 | Bansal et al. | 318/801 |
| 7,800,331 B2 | * | 9/2010 | Chakrabarti et al. | 318/440 |
| 8,253,360 B2 | * | 8/2012 | Schulz et al. | 318/400.02 |
| 8,558,501 B2 | * | 10/2013 | Tsunematsu et al. | 318/811 |
| 2012/0187892 A1 | * | 7/2012 | Tsunematsu et al. | 318/721 |

FOREIGN PATENT DOCUMENTS

JP    2010-057243 A    3/2010

* cited by examiner

*Primary Examiner* — Paul Ip
(74) *Attorney, Agent, or Firm* — Studebaker & Brackett PC (57) ABSTRACT

An inverter and a control unit that has a command signal processing unit and a PWM frequency control unit and performs pulse width modulation control are provided. If the command signal processing unit has received a first PWM frequency command signal, it outputs a low PWM frequency command signal so that synchronous or asynchronous PWM control is performed at a PWM frequency in a predetermined frequency range. The command signal processing unit outputs a high PWM frequency command signal so that synchronous or asynchronous PWM control is performed at a higher frequency than the above-mentioned frequency if the command signal processing unit has received a second PWM frequency command signal and until a predetermined time period elapses. The command signal processing unit outputs a low PWM frequency command signal if it has received the second PWM frequency command signal and after the predetermined time period elapsed.

6 Claims, 6 Drawing Sheets

AIRCRAFT MOTOR DRIVE CONTROL APPARATUS

CROSS-REFERENCE TO RELATED APPLICATION

This application claims priority to Japanese Patent Application No. 2012-8607. The entire disclosure of Japanese Patent Application No. 2012-8607 is hereby incorporated herein by reference.

BACKGROUND OF THE INVENTION

1. Field of the Invention

The present invention relates to aircraft motor drive control apparatuses for driving motors mounted in aircrafts to drive devices installed in the aircrafts, and controlling the operational status of the motors.

2. Description of the Related Art

Various electrically powered devices are installed in an aircraft, and such devices are driven by motors (electric motors) mounted in the aircraft. One example of the aforementioned devices is an electrically powered hydraulic pump for supplying pressure oil to an actuator for driving a control surface formed as a moving surface (flight control surface) and configured as an aileron or an elevator, or the like, as disclosed in JP 2007-46790A. Another example is an electrically powered hydraulic pump for supplying pressure oil to an actuator that drives a moving surface configured as a flap, a spoiler, or the like, an electric actuator for driving a moving surface such as the above-mentioned control surface or spoiler, or a leg (a mechanism supporting the body of an aircraft on the ground) such as a landing gear (undercarriage).

A motor drive control apparatus (aircraft motor drive control apparatus) that is also mounted in the aircraft drives a motor for driving those devices, and controls the operational status of the motor. From the viewpoint of improvement in efficiency, it is possible to use, as such a motor drive control apparatus, a motor drive control apparatus including an inverter that has a switching element and drives a motor and a controller that performs a pulse width modulation control (PWM control) of this inverter.

In the above-described motor drive control apparatus including an inverter and a controller that performs PWM control, the control performance is improved by increasing the PWM frequency, which is the switching frequency (carrier frequency) of the switching element. However, an increase in the PWM frequency leads to an increase in a loss in the switching element that is proportional to the PWM frequency, resulting in an increase in the amount of heat generation as well. Therefore, it is desired to provide a motor drive control apparatus that can ensure control performance and suppress heat generation in a well-balanced manner.

On the other hand, JP 2010-57243A discloses, as a motor drive control apparatus provided in a vehicle, a motor drive control apparatus that controls the PWM frequency from the viewpoint of reducing the noise generated depending on the frequency band of the PWM frequency, in addition to the viewpoints of ensuring control performance and suppressing heat generation. Note that the motor drive control apparatus disclosed in JP 2010-57243A is configured to perform synchronous PWM control if the current supplied to the motor by an inverter or the torque generated in the motor is greater than a threshold. Furthermore, if the above-mentioned current or torque is smaller than the threshold, this motor drive control apparatus is configured to perform synchronous PWM control or asynchronous PWM control and set the PWM frequency higher than in the case where the above-mentioned current or torque is greater than the threshold.

SUMMARY OF THE INVENTION

For a motor drive control apparatus (aircraft motor drive control apparatus) used for drive control of a motor for driving a device installed in an aircraft, a reduction of the noise generated depending on the frequency band of the PWM frequency is hardly needed, whereas it is desired to provide a motor drive control apparatus that can ensure control performance and suppress heat generation on a higher level in a well-balanced manner. Therefore, it is difficult to achieve this to a satisfying level with such a configuration as that of the motor drive control apparatus disclosed in JP 2010-57243A, in which the PWM frequency is controlled with synchronous PWM control or by selecting one of synchronous PWM control and asynchronous PWM control according to whether the current supplied to the motor or the generated torque is greater or smaller than a threshold.

Further, the required operational status of a device installed in an aircraft changes depending on various situations, including not only a situation where the flight condition of the aircraft is stable, but also a situation where the flight condition of the aircraft changes suddenly due to the weather or air current conditions, a situation where the aircraft takes off or lands, and a situation where an unexpected trouble has occurred. Accordingly, it is desired that a motor drive control apparatus that performs drive control of a motor for driving a device whose operational status changes depending on the situations of the aircraft in this way can efficiently ensure control performance and suppress heat generation on a higher level in a well-balanced manner.

Moreover, if the technique for ensuring control performance and suppressing heat generation on a higher level in a well-balanced manner is realized, the size of a heat sink that serves as a heat releasing means can be reduced, which leads to realization of a further size reduction of the configuration of the motor drive control apparatus. In the case where the further size reduction of the heat sink is thus achieved, it is desirable to realize a protective function that allows the motor to continue to operate while suppressing temperature rise, without stopping the motor operation to protect the motor drive control apparatus even if the amount of heat generation rises due to unsteady operational conditions.

In light of the foregoing actual situation, it is an object of the present invention to provide an aircraft motor drive control apparatus that is used for drive control of a motor for driving a device whose operational status to be required changes depending on the situation of an aircraft, and is capable of efficiently ensuring control performance and suppressing heat generation on a high level in a well-balanced manner, achieving a size reduction of its configuration, and further realizing a protective function that allows the motor to continue to operate while suppressing temperature rise even if the amount of heat generation rises due to unsteady operational conditions.

An aircraft motor drive control apparatus according to a first feature of the present invention to achieve the above-stated object is an aircraft motor drive control apparatus for driving a motor mounted in an aircraft to drive a device installed in the aircraft, and controlling an operational status of the motor, comprising: an inverter that has a switching element and drives the motor; and a control unit that performs pulse width modulation control of the inverter, the control unit including: a command signal processing unit that outputs a PWM frequency control signal for controlling a PWM frequency, which is a switching frequency in the switching element, based on a signal from a controller that generates a PWM frequency command signal for specifying the PWM frequency; and a PWM frequency control unit that controls the PWM frequency based on the PWM frequency control signal, wherein the command signal processing unit receives, as the PWM frequency command signal, one of a first PWM frequency command signal and a second PWM frequency command signal, if the command signal processing unit has received the first PWM frequency command signal, the command signal processing unit outputs, as the PWM frequency control signal, a low PWM frequency command signal for causing the PWM frequency control unit to control the PWM frequency so that synchronous PWM control or asynchronous PWM control is performed at the PWM frequency in a predetermined frequency range, if the command signal processing unit has received the second PWM frequency command signal, and until a time period that has passed after the receipt of the second PWM frequency command signal reaches a predetermined time period without receipt of the first PWM frequency command signal, the command signal processing unit outputs, as the PWM frequency control signal, a high PWM frequency command signal for causing the PWM frequency control unit to control the PWM frequency so that synchronous PWM control or asynchronous PWM control is performed at the PWM frequency in a higher frequency range than the predetermined frequency range, and if the command signal processing unit has received the second PWM frequency command signal and the time period that has passed without receipt of the first PWM frequency command signal after the receipt of the second PWM frequency command signal has reached the predetermined time, the command signal processing unit outputs, as the PWM frequency control signal, the low PWM frequency command signal.

With this configuration, a PWM frequency command signal is transmitted from the controller to the aircraft motor drive control apparatus. The controller can transmit either the first PWM frequency command signal or the second PWM frequency command signal as the PWM frequency command signal in accordance with the situation of the aircraft. For example, the controller can transmit the first PWM frequency command signal in a situation where high response and high-speed rotation of the motor are seldom required, as in a state where the flight condition of the aircraft is stable. Furthermore, the controller can transmit the second PWM frequency command signal if a state occurs where high responses, high-speed rotation, and high output of the motor are highly required when high-output driving is necessary at the time of or after activation in a situation where, for example, the flight condition of the aircraft is likely to change suddenly depending on the weather or air current conditions, in a situation where the aircraft takes off or lands, or in a situation where a sudden trouble has occurred.

With this configuration of the aircraft motor drive control apparatus, if the first PWM frequency command signal is received, the PWM frequency is controlled so that synchronous PWM control or asynchronous PWM control is performed at a PWM frequency in the predetermined frequency range. Therefore, by setting the predetermined frequency range to low frequencies, the PWM frequency is set to be a low frequency in the situation where high response of the motor is seldom required. Consequently, a loss in the switching element can be reduced appropriately in a range with which control performance can be ensured in accordance with the situation surrounding the aircraft, and heat generation can be suppressed. Meanwhile, with this aircraft motor drive control apparatus, the PWM frequency is controlled at a PWM frequency in the higher frequency range than the above-described predetermined frequency range if the second PWM frequency command signal is received. Therefore, it is possible to ensure sufficient control performance and achieve high response of the motor appropriately in accordance with the situation of the aircraft. Accordingly, because the PWM frequency is efficiently controlled based on the command signal transmitted from the controller in accordance with the situation of the aircraft, the aircraft motor drive control apparatus can ensure control performance and suppress heat generation on a high level in a well-balanced manner. Furthermore, it is thus possible to reduce the size of a heat sink serving as a heat releasing means, and achieve a further size reduction of the configuration of the aircraft motor drive control apparatus.

With the aircraft motor drive control apparatus, the command signal processing unit outputs the high PWM frequency command signal until a predetermined time period elapses after the receipt of the second PWM frequency command signal, and switches the PWM frequency control signal to be output thereby to the low PWM frequency command signal when the predetermined time period has elapsed. Therefore, the PWM frequency is set to a low frequency after a lapse of the predetermined time period even if the amount of heat generation rises due to unsteady operational conditions in the case where the second PWM frequency command signal has been transmitted from the controller because of the situation where high response, high-speed rotation, and high output of the motor are highly required. It is thus possible to reduce a loss in the switching element to suppress heat generation, and achieve a protective function that allows the motor to continue to operate while suppressing temperature rise, without stopping the operation of the motor to protect the motor drive control apparatus.

Accordingly, with the above-described configuration, it is possible to provide the aircraft motor drive control apparatus that is used for drive control of the motor for driving a device whose required operational state changes depending on the situation of the aircraft, and that is capable of efficiently ensuring control performance and suppressing heat generation on a high level in a well-balanced manner, reducing the size of the configuration, and further achieving a protective function that allows the motor to continue to operate while suppressing temperature rise even if the amount of heat generation rises due to unsteady operational conditions.

An aircraft motor drive control apparatus according to a second feature of the present invention is the aircraft motor drive control apparatus of the first feature, further comprising a temperature measurement unit that measures a temperature of the inverter, wherein the control unit has an upper-limit temperature determination unit that calculates a temperature change per unit time based on a result of temperature measurement at the temperature measurement unit, and outputs an upper-limit temperature determination signal to the command signal processing unit if the upper-limit temperature determination unit determines that the temperature will reach a predetermined upper-limit temperature, and the command signal processing unit outputs, as the PWM frequency control signal, the low PWM frequency command signal if the command signal processing unit has received the second PWM frequency command signal, and until the time period that has passed after the receipt of the second PWM frequency command signal reaches the predetermined time period without receipt of the first PWM frequency command signal, and further, if the command signal processing unit has received the upper-limit temperature determination signal.

With this configuration, the command signal processing unit outputs the high PWM frequency command signal after receiving the second PWM frequency command signal, and switches the PWM frequency control signal to be output thereby to the low PWM frequency command signal when the predetermined time period has elapsed. However, even before the predetermined time period elapses, the command signal processing unit switches the PWM frequency control signal to be output thereby to the low PWM frequency command signal if the command signal processing unit has received the upper-limit temperature determination signal. Therefore, even before the predetermined time elapses in the case where the second PWM frequency command signal has been transmitted from the controller because of the situation where high response, high-speed rotation, and high output of the motor are highly required, the PWM frequency is set to a low frequency if the amount of heat generation rises due to unsteady operational conditions, and heat generation is thereby suppressed. It is thus possible to further enhance the protective function that allows the motor to continue to operate while suppressing temperature rise, without stopping the operation of the motor to protect the motor drive control apparatus.

An aircraft motor drive control apparatus according to a third feature of the present invention is the aircraft motor drive control apparatus of the second feature, wherein the control unit includes a current control unit that controls a current supplied to the motor by the inverter, the upper-limit temperature determination unit outputs the upper-limit temperature determination signal also to the current control unit, and the current control unit reduces the current supplied to the motor by the inverter if the current control unit receives the upper-limit temperature determination signal while the PWM frequency control unit is controlling the PWM frequency based on the low PWM frequency command signal output by the command signal processing unit after receiving the upper-limit temperature determination signal.

With this configuration, the command signal processing unit outputs the high PWM frequency command signal after receiving the second PWM frequency command signal, and switches the PWM frequency control signal to be output thereby to the low PWM frequency command signal when the predetermined time period has elapsed. Even before the predetermined time period elapses, the command signal processing unit switches the PWM frequency control signal to be output thereby to the low PWM frequency command signal if it has received the upper-limit temperature determination signal. However, if, in this state, the current control unit has received the upper-limit temperature determination signal, the current control unit reduces current supplied to the motor. Therefore, even if the upper-limit temperature determination signal has been received before the predetermined time period elapses in the case where the second PWM frequency command signal has been transmitted from the controller because of the situation where high response, high-speed rotation, and high output of the motor are highly required, the current supplied to the motor is reduced if the upper-limit temperature determination signal is received again because the amount of heat generation rose due to unsteady operational conditions, and heat generation is thus suppressed. It is thus possible to further enhance, on a higher level, the protective function that allows the motor to continue to operate while suppressing temperature rise, without stopping the operation of the motor to protect the motor drive control apparatus.

An aircraft motor drive control apparatus according to a fourth feature of the present invention is the aircraft motor drive control apparatus of the first feature, wherein further comprising a temperature measurement unit that measures a temperature of the inverter, wherein the controller includes: a current control unit that controls a current supplied to the motor by the inverter; and an upper-limit temperature determination unit that calculates a temperature change per unit time based on a result of temperature measurement at the temperature measurement unit, and outputs an upper-limit temperature determination signal to the current control unit if the upper-limit temperature determination unit determines that the temperature will reach a predetermined upper-limit temperature, and the current control unit reduces the current supplied to the motor by the inverter if the current control unit has received the upper-limit temperature determination signal.

With this configuration, the command signal processing unit outputs the high PWM frequency command signal after receiving the second PWM frequency command signal, and switches the PWM frequency control signal to be output thereby to the low PWM frequency command signal when the predetermined time period has elapsed. However, even before the predetermined time period elapses, the current control unit reduces current supplied to the motor if the current control unit has received the upper-limit temperature determination signal. Therefore, even before the predetermined time elapses in the case where the second PWM frequency command signal has been transmitted from the controller because of the situation where high response, high-speed rotation, and high output of the motor are highly required, the current supplied to the motor is reduced if the amount of heat generation rises due to unsteady operational conditions, and heat generation is thereby suppressed. It is thus possible to further enhance the protective function that allows the motor to continue to operate while suppressing temperature rise, without stopping the operation of the motor to protect the motor drive control apparatus.

An aircraft motor drive control apparatus according to a fifth feature of the present invention is an aircraft motor drive control apparatus for driving a motor mounted in an aircraft to drive a device installed in the aircraft, and controlling an operational status of the motor, comprising: an inverter that has a switching element and drives the motor; a control unit that performs pulse width modulation control of the inverter, and a temperature measurement unit that measures a temperature of the inverter, the controller including: a command signal processing unit that outputs a PWM frequency control signal for controlling a PWM frequency, which is a switching frequency in the switching element, based on a signal from a controller that generates a PWM frequency command signal for specifying the PWM frequency; a PWM frequency control unit that controls the PWM frequency based on the PWM frequency control signal; and an upper-limit temperature determination unit that calculates a temperature change per unit time based on a result of temperature measurement at the temperature measurement unit, and outputs an upper-limit temperature determination signal to the command signal processing unit if the upper-limit temperature determination unit determines that the temperature will reach a predetermined upper-limit temperature, wherein the command signal processing unit receives, as the PWM frequency command signal, one of a first PWM frequency command signal and a second PWM frequency command signal, if the command signal processing unit has received the first PWM frequency command signal, the command signal processing unit outputs, as the PWM frequency control signal, a low PWM frequency command signal for causing the PWM frequency control unit to control the PWM frequency so that synchronous PWM control or asynchronous PWM control is performed at the PWM frequency in a predetermined frequency range, if the command signal processing unit has received the second PWM frequency command signal but has not received the upper-limit temperature determination signal, the command signal processing unit outputs, as the PWM frequency control signal, a high PWM frequency command signal for causing the PWM frequency control unit to control the PWM frequency so that synchronous PWM control or asynchronous PWM control is performed at the PWM frequency in a higher frequency range than the predetermined frequency range, and if the command signal processing unit has received the second PWM frequency command signal and also received the upper-limit temperature determination signal, the command signal processing unit outputs, as the PWM frequency control signal, the low PWM frequency command signal.

With this configuration, the PWM frequency is efficiently controlled based on the command signal transmitted from the controller in accordance with the situation of the aircraft, as with the aircraft motor drive control apparatus of the first feature, and therefore, it is possible to ensure control performance and suppress heat generation on a high level in a well-balanced manner. Furthermore, it is thus possible to reduce the size of a heat sink serving as a heat releasing means, and achieve a further size reduction of the configuration of the aircraft motor drive control apparatus.

With the aircraft motor drive control apparatus of the fifth feature, the command signal processing unit outputs the high PWM frequency command signal if it receives the second PWM frequency command signal but does not receive the upper-limit temperature determination signal, while the command signal processing unit switches the PWM frequency control signal to be output thereby to the PWM frequency command signal if it receives the upper-limit temperature determination signal. Therefore, the PWM frequency is set to a low frequency if the amount of heat generation increases due to unsteady operational conditions in the case where the second PWM frequency command signal has been transmitted from the controller because of the situation where high response, high-speed rotation, and high output of the motor are highly required. It is thus possible to reduce a loss in the switching element to suppress heat generation, and achieve a protective function that allows the motor to continue to operate while suppressing temperature rise, without stopping the operation of the motor to protect the motor drive control apparatus.

Accordingly, with the above-described configuration, it is possible to provide the aircraft motor drive control apparatus that is used for drive control of the motor for driving a device whose required operational state changes depending on the situation of the aircraft, and that is capable of efficiently ensuring control performance and suppressing heat generation on a high level in a well-balanced manner, reducing the size of the configuration, and further achieving a protective function that allows the motor to continue to operate while suppressing temperature rise even if the amount of heat generation rises due to unsteady operational conditions.

An aircraft motor drive control apparatus according to a sixth feature of the present invention is the aircraft motor drive control apparatus of the fifth feature, wherein the control unit includes a current control unit that controls a current supplied to the motor by the inverter, the upper-limit temperature determination unit outputs the upper-limit temperature determination signal also to the current control unit, and the current control unit reduces the current supplied to the motor by the inverter if the current control unit receives the upper-limit temperature determination signal while the PWM frequency control unit is controlling the PWM frequency based on the low PWM frequency command signal output by the command signal processing unit after receiving the upper-limit temperature determination signal.

With this configuration, the command signal processing unit outputs the high PWM frequency command signal after receiving the second PWM frequency command signal, and switches the PWM frequency control signal to be output thereby to the low PWM frequency command signal if it has received the upper-limit temperature determination signal. However, if, in this state, the current control unit further has received the upper-limit temperature determination signal, the current control unit reduces the current supplied to the motor. Therefore, even if the upper-limit temperature determination signal has been received in the case where the second PWM frequency command signal has been transmitted from the controller because of the situation where high response, high-speed rotation, and high output of the motor are highly required, the current supplied to the motor is reduced if the upper-limit temperature determination signal is received again because the amount of heat generation rose due to unsteady operational conditions, and heat generation is thereby suppressed. It is thus possible to further enhance the protective function that allows the motor to continue to operate while suppressing temperature rise, without stopping the operation of the motor to protect the motor drive control apparatus.

It should be appreciated that the above and other objects, features and advantages of the present invention will become apparent from the following description taken in conjunction with the accompanying drawings.

DETAILED DESCRIPTION OF THE INVENTION

An embodiment for implementing the present invention will be hereinafter described with reference to the drawings. Note that the embodiment of the present invention can be widely applied to aircraft motor drive control apparatuses and aircraft motor drive control systems that drive motors mounted in aircrafts to drive devices installed in the aircrafts and control the operational status of the motors.

Figure 1:
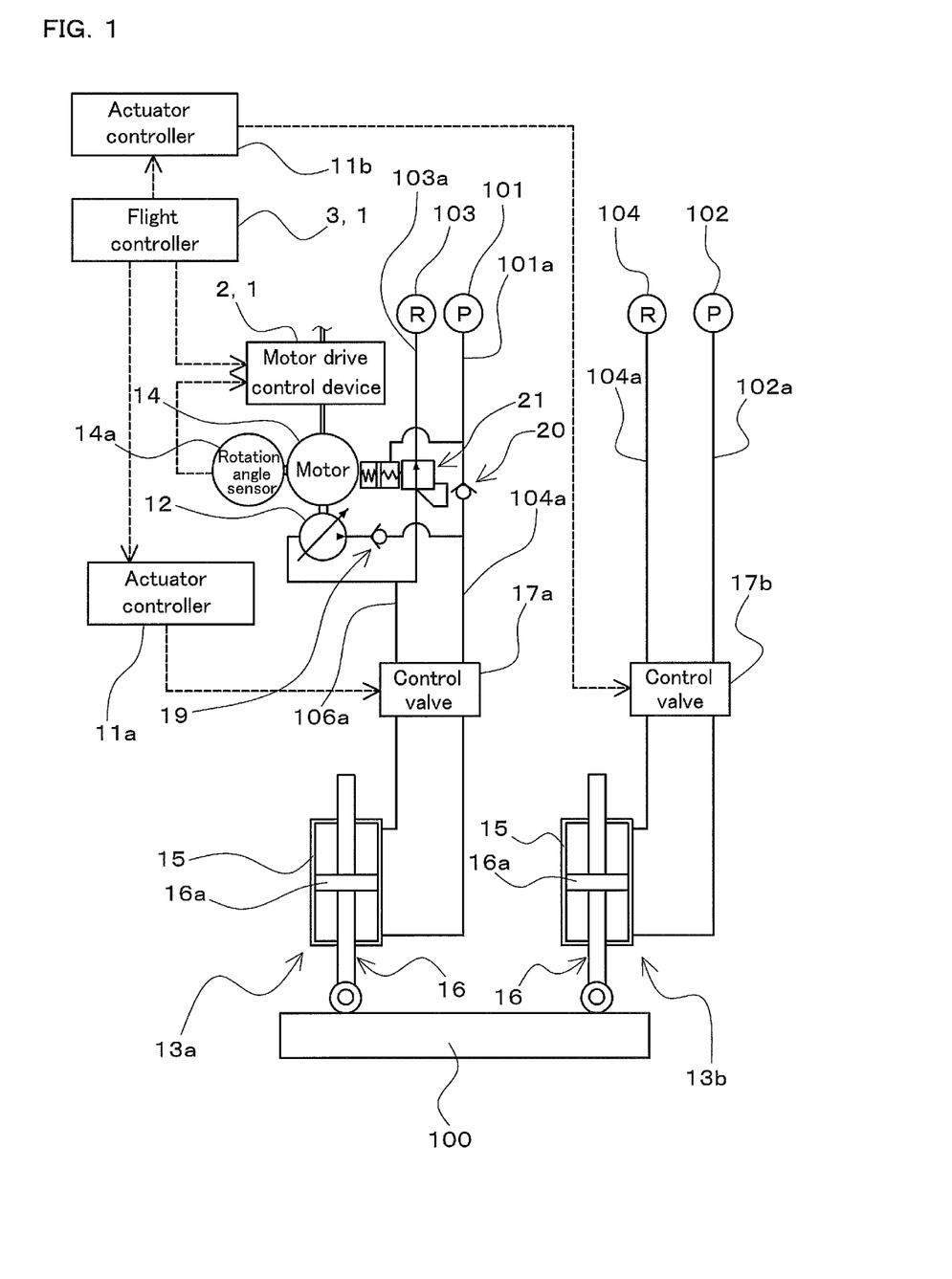
FIG. 1 is a schematic diagram showing an aircraft motor drive control apparatus according to one embodiment of the present invention, together with a hydraulic circuit including a device to which this aircraft motor drive control apparatus is applied.

FIG. 1 is a schematic diagram showing an aircraft motor drive control apparatus 2 according to one embodiment of the present invention and an aircraft motor drive control system 1 including this aircraft motor drive control apparatus 2, together with a hydraulic circuit including a device to which they are applied. Note that the present embodiment will be described, taking, as an example, the case where the device to which the aircraft motor drive control apparatus 2 is applied is a backup hydraulic pump 12 installed in an aircraft (not shown).

In the following description, a description will be first given of the hydraulic circuit including the backup hydraulic pump 12 to which the aircraft motor drive control apparatus 2 (hereinafter also simply referred to as "motor drive control apparatus 2") and the aircraft motor drive control system 1 (hereinafter also simply referred to as "motor drive control system 1") provided therewith are applied, and then of the motor drive control apparatus 2 and the motor drive control system 1.

Note that the backup hydraulic pump 12 included in the hydraulic circuit shown in FIG. 1 is provided as an electrically powered hydraulic pump for supplying pressure oil to an actuator 13a that drives a moving surface 100 of the aircraft (not shown). The moving surface 100 is provided as a flight control surface, and configured as a control surface such as, for example, an aileron installed on a main wing, an elevator installed on a tailplane, or a rudder installed on a vertical tail. The moving surface 100 may alternatively configured as a flap, a spoiler provided as a flight spoiler or a ground spoiler, or the like.

The moving surface 100 shown in FIG. 1 is installed on a fixed wing. For example, if the moving surface 100 is provided as an elevator, it is installed on a tailplane serving as a fixed wing. The moving surface 100 is configured to be driven by a plurality of (e.g., two) actuators (13a, 13b). Inside the fixed wing on which the moving surface 100 is installed, the actuators (13a, 13b) for driving the moving surface 100 and the backup hydraulic pump 12 configured to supply the pressure oil to the actuator 13a, which is one of the actuators (13a, 13b), are installed.

As shown in FIG. 1, each actuator (13a, 13b) has a cylinder 15, a rod 16 provided with a piston 16a, and so on. The cylinder 15 is internally divided by the piston 16a into two oil chambers that are not in communication with each other. Each oil chamber in the cylinder 15 in the actuator 13a is able to be in communication, via a control valve 17a, with a first aircraft central hydraulic power source 101 and a reservoir circuit 103. Meanwhile, each oil chamber in the cylinder 15 in the actuator 13b is able to in be communication, via a control valve 17b, with a second aircraft central hydraulic power source 102 and a reservoir circuit 104.

Each of the first aircraft central hydraulic power source 101 and the second aircraft central hydraulic power source 102 has a hydraulic pump for supplying the pressure oil, and is provided as a hydraulic power source that works as an independent system and is installed on an airframe (not shown) side (inside an airframe). The actuators (13a, 13b) for driving the moving surface 100 and actuators (not shown) for driving moving surfaces other than the moving surface 100 are configured to operate by the pressure oil being supplied from the first and second aircraft central hydraulic power sources (101, 102).

The reservoir circuit 103 has a tank (not shown) into which oil (hydraulic fluid) discharged from one of the oil chambers in the actuator 13a after being supplied thereto as the pressure oil flows and returns, and is further in communication with the first aircraft central hydraulic power source 101. The reservoir circuit 104, which is configured as a system independent from the reservoir circuit 103, has a tank (not shown) into which oil (hydraulic fluid) discharged from one of the oil chambers in the actuator 13b after being supplied thereto as the pressure oil flows and returns, and is further in communication with the second aircraft central hydraulic power source 102, which is configured as a system independent from the first aircraft central hydraulic power source 101. The pressure of the oil that has returned to the reservoir circuit 103 is raised by the first aircraft central hydraulic power source 101, and the oil is then supplied to the actuator 13a. Meanwhile, the pressure of the oil that has returned to the reservoir circuit 104 is raised by the second aircraft central hydraulic power source 102, and the oil is then supplied to the actuator 13b.

The control valve 17a is provided as a valve mechanism for switching the state of connection of the oil chambers in the actuator 13a to a supply path 101a in communication with the first aircraft central hydraulic power source 101 and a discharge path 103a in communication with the reservoir circuit 103. The control valve 17b is provided as a valve mechanism for switching the state of connection of the oil chambers in the actuator 13b to a supply path 102a in communication with the second aircraft central hydraulic power source 102 and a discharge path 104a in communication with the reservoir circuit 104. The control valve 17a is configured as, for example, a solenoid-operated control valve, and is driven based on a command signal from an actuator controller 11a for controlling operation of the actuator 13a. The control valve 17b is configured as, for example, a solenoid-operated control valve, and is driven based on a command signal from an actuator controller 11b for controlling operation of the actuator 13b.

The above-mentioned actuator controller 11a controls the actuator 13a based on a command signal from a flight controller 3 that is a superordinate computer that commands the moving surface 100 to operate in the motor drive control system 1. The actuator controller 11b controls the actuator 13b based on a command signal from the flight controller 3.

As a result of the above-mentioned control valve 17a being switched based on a command from the actuator controller 11a, the pressure oil is supplied from the supply path 101a to one of the oil chambers in the cylinder 15, and the oil is discharged from the other oil chamber to the discharge path 103a. Thus the rod 16 is displaced with respect to the cylinder 15, and the moving surface 100 is driven. Note that a description of the control valve 17b, which is configured in the same manner as the above-described control valve 17a, will be omitted.

The backup hydraulic pump 12 is installed inside a fixed wing (not shown) on which the moving surface 100 is provided, and is configured to supply the pressure oil to the hydraulically powered actuator 13a for driving the moving surface 100. The backup hydraulic pump 12 is connected so as to be in communication on its suction side with the discharge path 103a, and is connected so as to be in communication on its discharge side with the supply path 101a via a check valve 19 so that the pressure oil can be supplied to the supply path 104a. The backup hydraulic pump 12 is provided as a hydraulic pump capable of supplying the pressure oil to the actuator 13a in the case where a loss or degradation of the function (pressure oil supply function) of the first aircraft central hydraulic power source 101 occurs due to failure, oil leakage, or the like of the hydraulic pump in the first aircraft central hydraulic power source 101.

The supply path 101a is provided, on the upstream side (the first aircraft central hydraulic power source 101 side) of a portion connected to the backup hydraulic pump 12 on the discharge side thereof, with a check valve 20 for allowing a flow of the pressure oil to the actuator 13a and preventing a reverse oil flow. The discharge path 103a is provided, on the downstream side (the reservoir circuit 103 side) of a portion connected to the backup hydraulic pump 12 on the suction side thereof, with a relief valve 21 for discharging the pressure oil to the reservoir circuit 103 when the pressure of the oil discharged from the actuator 13a rises. The relief valve 21 is provided with a pilot pressure chamber that is in communication with the supply path 101a and in which a spring is disposed. If the pressure of the pressure oil supplied from the supply path 101a falls below a predetermined pressure value, the pressure (pilot pressure) of the pressure oil supplied as the pilot pressure oil from the supply path 101a to the above-mentioned pilot pressure chamber also falls below a predetermined pressure value, and the discharge path 103a is blocked by the relief valve 21. In the case of a loss or degradation of the function of the first aircraft central hydraulic power source 101, the oil discharged from the actuator 13a does not return to the reservoir circuit 103, but the pressure of the oil is raised by the backup hydraulic pump 12, and the pressure oil with the raised pressure is supplied to the actuator 13a because of provision of the above-described check valves (19, 20) and the relief valve 21.

The motor 14, which is provided as an electric motor, is connected to the backup hydraulic pump 12 via a coupling, and is configured to drive the backup hydraulic pump 12. In other words, the motor 14 constitutes a motor in the present embodiment that is mounted in the aircraft (not shown) for driving the backup hydraulic pump 12, which serves as a device in the present embodiment that is installed in the aircraft.

The motor 14 is configured as, for example, a synchronous motor. Note that although the motor 14 may alternatively be configured as any electric motor other than a synchronous motor, the efficiency can be improved with the motor 14 configured as a synchronous motor, as compared with the motor 14 configured as an induction motor that causes slip, which is a delay of a rotational speed of a rotor relative to a rotating magnetic field of a stator. Furthermore, the motor 14 is provided with a rotation angle sensor 14a for detecting the rotational speed (number of rotations) of the motor 14. The rotation angle sensor 14a is constituted by, for example, a rotary encoder, a resolver, a tacho generator, or the like.

Figure 2:
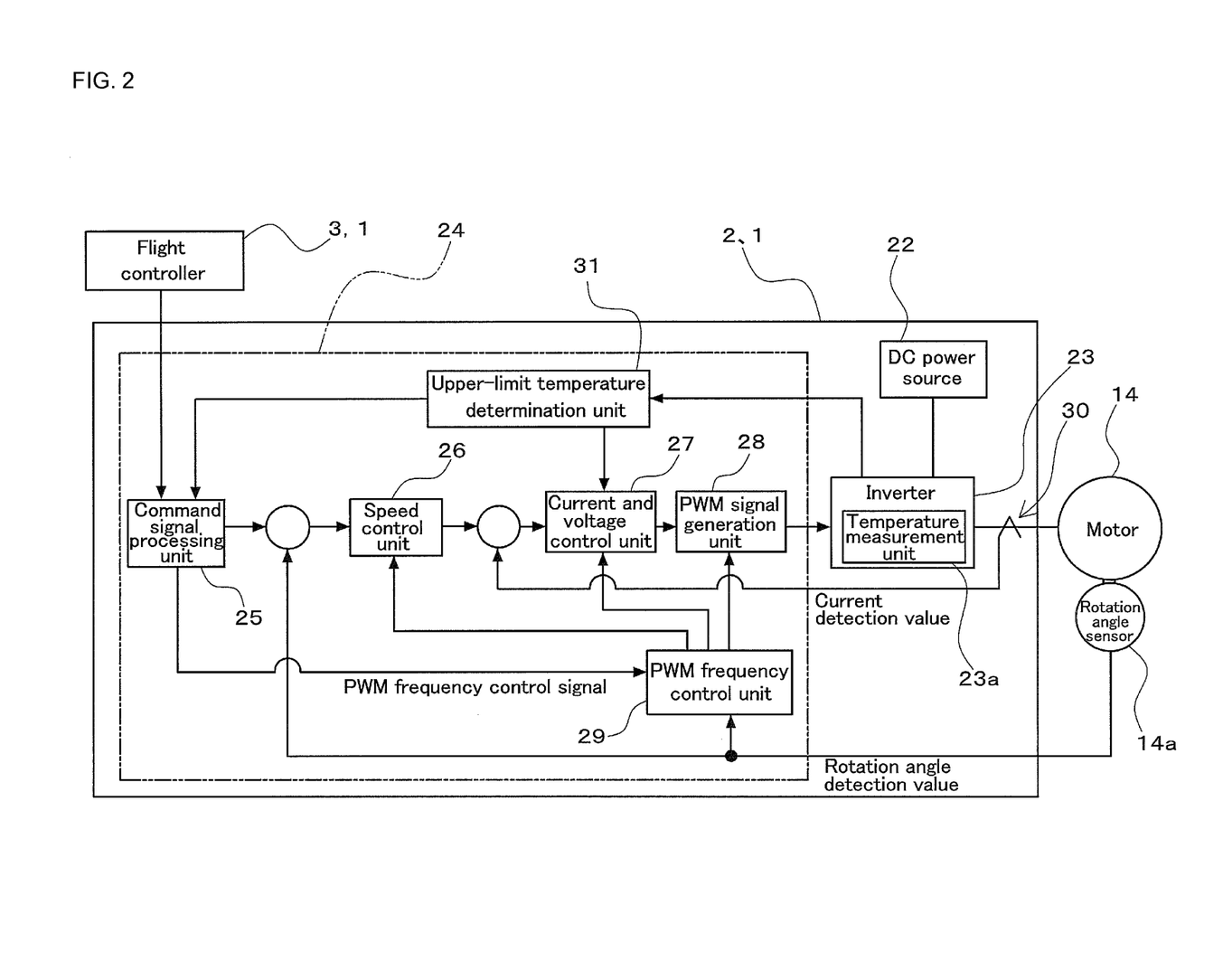
FIG. 2 is a block diagram showing a configuration of the aircraft motor drive control apparatus shown in FIG. 1.

Next, a description will be given of the motor drive control system 1 and the motor drive control apparatus 2 according to the present embodiment that drive the motor 14 and control the operational status thereof. FIG. 2 is a block diagram showing the motor drive control system 1 and the motor drive control apparatus 2. As shown in FIGS. 1 and 2, the motor drive control system 1 includes the flight controller 3 and the motor drive control apparatus 2.

The flight controller 3 is provided as a computer that controls operation of the moving surface 100, and constitutes a controller in the present embodiment for transmitting various signals to the motor drive control apparatus 2. The operational status of the motor 14 is controlled by the motor drive control apparatus 2 based on the signals from the flight controller 3. Note that the flight controller 3 includes, for example, a CPU (Central Processing Unit), a memory, an interface, and so on, which are not shown in the drawings.

The flight controller 3 is connected to a pressure sensor (not shown) for detecting the discharge pressure of the first aircraft central hydraulic power source 101 or the pressure of the pressure oil that passes through the supply path 101a so that a pressure detection signal detected by this pressure sensor is input to the flight controller 3. The flight controller 3 is configured to detect a loss or degradation of the function of the first aircraft central hydraulic power source 101 based on the above-mentioned pressure detection signal.

Upon the flight controller 3 detecting a loss or degradation of the function of the first aircraft central hydraulic power source 101, the motor 14 is started to run, the backup hydraulic pump 12 operates, and the pressure oil is supplied to the actuator 13a under the control of the motor drive control apparatus 2 based on a command from the flight controller 3. Note that after the backup hydraulic pump 12 is thus activated, the rotational speed and output torque of the motor 14 are controlled through the control of the motor drive control apparatus 2 based on a signal from the flight controller 3 in conformity with the operational state of the actuator 13a suitable for the flight condition of the aircraft (not shown).

Further, the flight controller 3 activates the motor 14 not only in the situation where a sudden trouble such as a loss or degradation of the function of the first aircraft central hydraulic power source 101 has occurred, but also in a situation where the flight condition of the aircraft is likely to change suddenly depending on the weather or air current condition, or in a situation where the aircraft takes off or lands, or the like. Thus, in such situations as those described above, the pressure oil is supplied from the backup hydraulic pump 12 to the actuator 13a, resulting in enhancement in the function of pressure oil supply to the actuator 13a. Furthermore, even if a loss or degradation of the function of the first aircraft central hydraulic power source 101 suddenly occurs in such situations as those described above, safe flight can be immediately secured because the motor is already operating. After the backup hydraulic pump 12 is activated as above, the rotational speed and output torque of the motor 14 is controlled through the control of the motor drive control apparatus 2 based on a signal from the flight controller 3 in association with the operational state of the actuator 13a suitable for the flight condition of the aircraft. Note that exemplary cases where the motor 14 is activated at the time of takeoff and landing include a case where the moving surface 100 is provided as a ground spoiler.

As shown in FIG. 2, the motor drive control apparatus 2 includes a DC power source 22, an inverter 23, a control unit 24, and so on. The DC power source (direct-current power source) 22 is provided as a rectifier (converter) for rectifying alternating current supplied from, for example, an AC power source installed in the body of the aircraft into direct current.

The inverter 23 has a switching element such as an IGBT (Insulated Gate Bipolar Transistor) or the like, and is configured to drive the motor 14 by electric power from the DC power source 22 based on a command from the control unit 24. The value of current that runs through a drive line connecting the inverter 23 to the motor 14 is detected by a current sensor 30 and input to the control unit 24. The inverter 23 is provided with a temperature measurement unit 23a configured as a temperature sensor for measuring the temperature of the inverter 23.

The control unit 24 is provided as a control circuit for performing pulse width modulator control (PWM control) of the inverter 23. The control unit 24 controls the rotational speed of the motor 14 based on a speed command signal generated by the flight controller 3 for specifying the rotational speed of the motor 14 to control the operation of the backup hydraulic pump 12, as well as a rotation angle detection value at the rotation angle sensor 14a. As shown in FIG. 2, the control unit 24 includes a command signal processing unit 25, a speed control unit 26, a current and voltage control unit 27, a PWM signal generation unit 28, a PWM frequency control unit 29, an upper-limit temperature determination unit 31, and so on.

The upper-limit temperature determination unit 31 is configured so as to receive input of a signal associated with a result of temperature measurement on the inverter 23 by the temperature measurement unit 23a. This upper-limit temperature determination unit 31 calculates a temperature change per unit time based on the temperature measurement result at the temperature measurement unit 23a, and outputs an upper-limit temperature determination signal to the command signal processing unit 25 and the current and voltage control unit 27, which will be described later, upon determining that the measured temperature will reach a predetermined upper-limit temperature. Note that the control unit 24 is provided with a timer (not shown) for measuring time, and the result of time measurement by this timer is constantly input to the upper-limit temperature determination unit 31, the command signal processing unit 25, the speed control unit 26, the current and voltage control unit 27, the PWM signal generation unit 28, and the PWM frequency control unit 29.

Regarding the upper-limit temperature determination by the upper-limit temperature determination unit 31, various modes thereof can be employed. For example, the upper-limit temperature determination unit 31 determines whether or not the temperature will reach a predetermined upper-limit temperature when it is assumed, based on the measured temperature and the temperature change per unit time at the time of the temperature measurement, that this temperature change continues for a predetermined time period from this temperature measurement.

The command signal processing unit 25 outputs a PWM frequency control signal for controlling the PWM frequency based on a signal from the flight controller 3 that generates a PWM frequency command signal for specifying the PWM frequency, which is a switching frequency (carrier frequency) of the switching element in the inverter 23.

The command signal processing unit 25 receives, as the PWM frequency command signal, either a first PWM frequency command signal or a second PWM frequency command signal. Note that either the first PWM frequency command signal or the second PWM frequency command signal is transmitted from the flight controller 3 to the command signal processing unit 25 in the motor drive control apparatus 2 in accordance with the situation of the aircraft.

The first PWM frequency command signal is configured as a signal for causing the command signal processing unit 25 to output a low PWM frequency command signal. In other words, if the command signal processing unit 25 has received the first PWM frequency command signal, it outputs the low PWM frequency command signal as the PWM frequency control signal. Here, the low PWM frequency command signal is configured as a signal for causing the PWM frequency control unit 29, which will be described later, to control the PWM frequency so that synchronous PWM control or asynchronous PWM control is performed at a PWM frequency in a predetermined frequency range.

Note that the low PWM frequency command signal may be configured as a signal for causing the PWM frequency control unit 29 to control the PWM frequency so that only synchronous PWM control is performed at a PWM frequency in a predetermined frequency range. Alternatively, the low PWM frequency command signal may be configured as a signal for causing the PWM frequency control unit 29 to control the PWM frequency so that only asynchronous PWM control is performed at a PWM frequency in a predetermined frequency range.

The second PWM frequency command signal is configured as a signal for causing the command signal processing unit 25 to output a high PWM frequency command signal or a low PWM frequency command signal. The command signal processing unit 25 outputs the high PWM frequency command signal as the PWM frequency control signal if the command signal processing unit 25 has received the second PWM frequency command signal, and until a time period that has passed after the receipt of the second PWM frequency command signal reaches a predetermined time period without receipt of the first PWM frequency command signal. Further, the command signal processing unit 25 outputs the low PWM frequency command signal as the PWM frequency control signal if the command signal processing unit 25 has received the second PWM frequency command signal and the time period that has passed after the receipt of the second PWM frequency command signal reaches the predetermined time period without receipt of the first PWM frequency command signal.

Here, the high PWM frequency command signal is configured as a signal for causing the PWM frequency control unit 29, which will be described later, to control the PWM frequency so that synchronous PWM control is performed at a PWM frequency in a higher frequency range than the predetermined frequency range in the case of the low PWM frequency command signal.

Note that the high PWM frequency command signal may be configured as a signal for causing the PWM frequency control unit 29 to control the PWM frequency so that only asynchronous PWM control is performed at a PWM frequency in a higher frequency range than the predetermined frequency range in the case of the low PWM frequency command signal. Alternatively, the high PWM frequency command signal may be configured as a signal for causing the PWM frequency control unit 29 to control the PWM frequency so that synchronous PWM control or asynchronous PWM control is performed at a PWM frequency in a higher frequency range than the predetermined frequency range in the case of the low PWM frequency command signal.

Further, the command signal processing unit 25 outputs the low PWM frequency command signal as the PWM frequency control signal if the command signal processing unit 25 received the second PWM frequency command signal, and until the time period that has passed after the receipt of the second PWM frequency command signal reaches the predetermined time period without receipt of the first PWM frequency command signal, and further, if the command signal processing unit 25 has received the upper-limit temperature determination signal.

Figure 3:
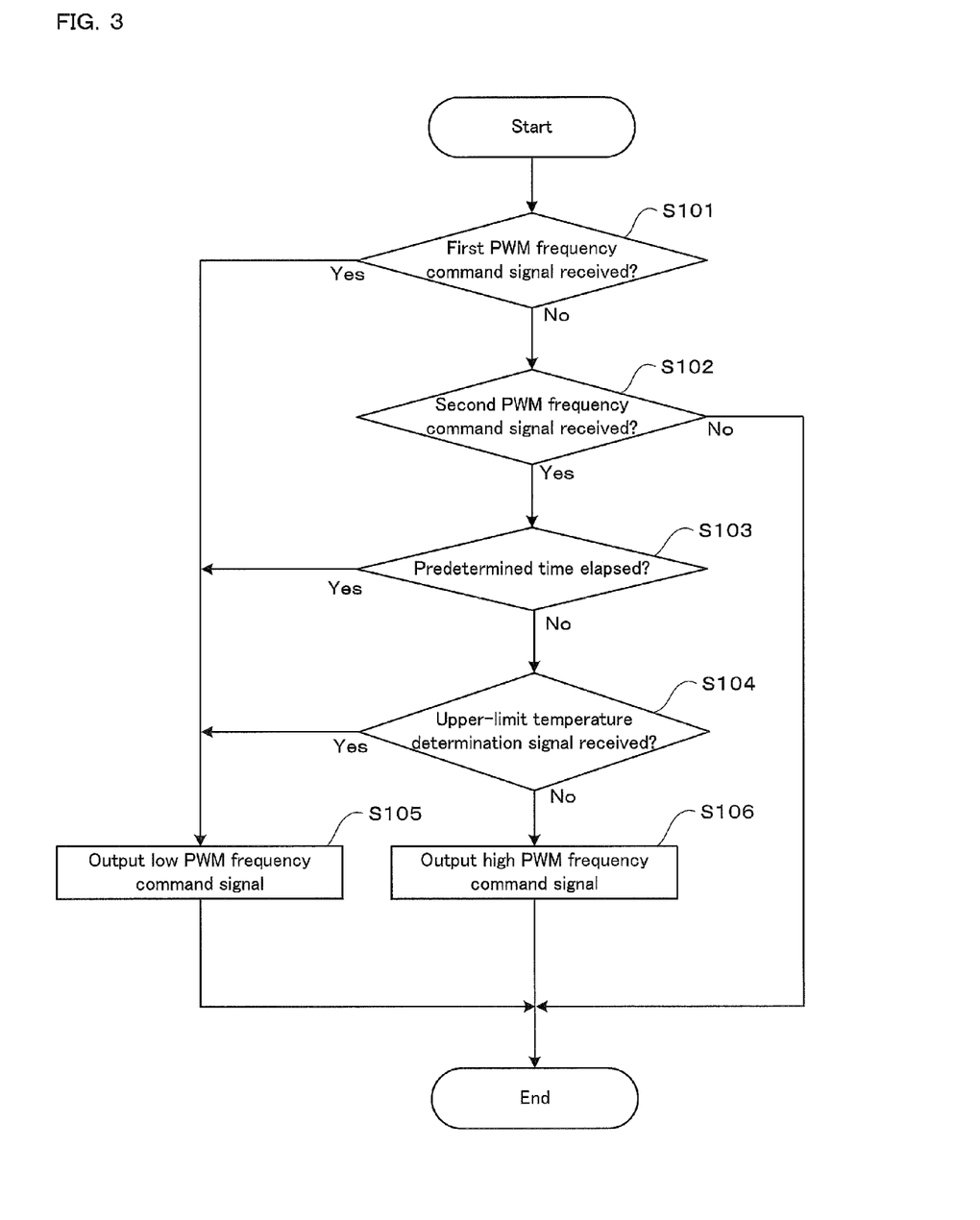
FIG. 3 is a flowchart illustrating processing performed in the aircraft motor drive control apparatus shown in FIG. 2.

FIG. 3 is a flowchart illustrating processing performed at the above-described command signal processing unit 25. At the command signal processing unit 25, the processing shown in the flowchart of FIG. 3 is repeatedly executed. First, at the command signal processing unit 25, it is determined whether or not the PWM frequency command signal received from the flight controller 3 is the first PWM frequency command signal (step S101). Then, if the first PWM has been received (step S101, Yes), the low PWM frequency command signal is output as the PWM frequency control signal (step S105).

On the other hand, if it is determined that the first PWM frequency command signal has not been received (step S101, No), it is then determined whether or not the signal from the flight controller 3 is the second PWM frequency command signal (step S102). If it is determined that the second PWM frequency signal has not been received (step S102, No), it indicates the state where neither the first PWM frequency command signal nor the second PWM frequency command signal has been received by the command signal processing unit 25. In this case, the processing in step S101 and subsequent steps is performed again.

On the other hand, if the second PWM frequency command signal has been received (step S102, Yes), it is further determined whether or not the time period that has passed after the receipt of the second PWM frequency command signal has reached the above-described predetermined time period without receipt of the first PWM frequency command signal (step S103). Note that the time period that has passed after the receipt of the second PWM frequency command signal without receipt of the first PWM frequency command signal is determined during when the processing shown in the flowchart of FIG. 3 is repeatedly performed.

If it is determined in step S103 that the time period that has passed after the receipt of the second PWM frequency command has not reached the above-described predetermined time period signal without receipt of the first PWM frequency command signal (step S103, No), it is determined next whether or not the upper-limit temperature determination signal has been received from the upper-limit temperature determination unit 31 (step S104). If it is determined that the upper-limit temperature determination signal has not been received (step S104, No), the high PWM frequency command signal is output as the PWM frequency control signal (step S106).

On the other hand, if it is determined in step S103 that the time period that has passed after the receipt of the second PWM frequency command signal has reached the predetermined time period without receipt of the first PWM frequency command signal (step S103, Yes), the low PWM frequency command signal is output as the PWM frequency control signal (step S105). In this case, the state immediately before the low PWM frequency command signal is output is the state until the predetermined time period elapses, and therefore, the high PWM frequency command signal has been output. Accordingly, in this case (step S103, Yes), the PWM frequency control signal is switched from the high PWM frequency command signal to the low PWM frequency command signal (step S105).

If it is determined in step S104 that the upper-limit temperature determination signal has been received (step S104, Yes), the low PWM frequency command signal is output as the PWM frequency control signal (step S105). In this case (step S104, Yes), the state immediately before the low PWM frequency command signal is output is the state at the time when the high PWM frequency command signal has been output, and therefore, the PWM frequency control signal is switched from the high PWM frequency command signal to the low PWM frequency command signal (step S105). In other words, until the time period that has passed after the receipt of the second PWM frequency command signal reaches the predetermined time period without the command signal processing unit 25 receiving the first PWM frequency command signal, and if the upper-limit temperature determination signal has been received, the PWM frequency control signal is switched from the high PWM frequency command signal to the low PWM frequency command signal.

At the command signal processing unit 25, after steps S105 and S106 are performed, the processing in step S101 and subsequent steps is performed again. In other words, in the command signal processing unit 25, the processing in steps S101 to S106 is repeatedly performed.

The speed control unit 26 shown in FIG. 2 is configured to perform feedback control of the rotational speed of the motor 14 based on the speed command signal for the motor 14 transmitted from the flight controller 3 and input via the command signal processing unit 25, and the rotation angle detection signal at the rotation angle sensor 14a.

Furthermore, at the current and voltage control unit 27, a current command value is calculated based on an output torque command signal transmitted from the flight controller 3 and a current detection value detected by the current sensor 30. Furthermore, the current and voltage control unit 27 calculates a voltage command value based on the calculated current command value. The current and voltage for the motor 14 are controlled based on the above current command value and voltage command value.

The current and voltage control unit 27 constitutes a current control unit in the present embodiment for controlling the current supplied to the motor 14 by the inverter 23. If this current and voltage control unit 27 receives the upper-limit temperature determination signal while the PWM frequency control unit 29, which will be described later, is controlling the PWM frequency based on the low PWM frequency command signal output by the command signal processing unit 25 after receiving the above-mentioned upper-limit temperature determination signal, the current and voltage control unit 27 reduces the current supplied to the motor 14 by the inverter 23.

The PWM signal generation unit 28 is configured to compare a sine wave serving as the voltage command value generated by the current and voltage control unit 27 with a triangular wave serving as a carrier wave generated by the PWM frequency control unit 29, which will be described later, to generate a PWM waveform signal.

The PWM frequency control unit 29 is configured to control the PWM frequency based on the PWM frequency control signal output from the command signal processing unit 25. Here, FIGS. 4A, and 4B are graphs illustrating processing shown as an example of the processing in the present embodiment performed at the PWM frequency control unit 29, schematically showing a relationship between the PWM frequency and the rotational speed of the motor 14.

Figure 4A:
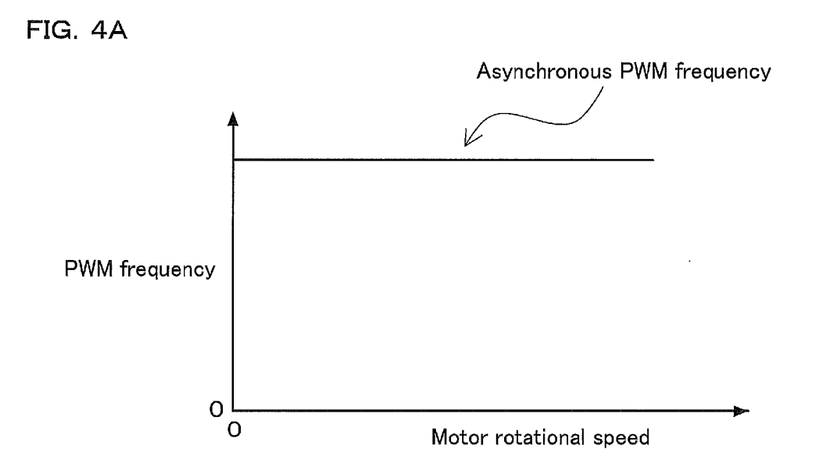
FIG. 4A is a graph illustrating processing performed in the aircraft motor drive control apparatus shown in FIG. 2.

If the high PWM frequency command signal is input as the PWM frequency control signal, the PWM frequency control unit 29 controls the PWM frequency so that asynchronous PWM control is performed at a fixed high frequency, as shown in FIG. 4A. In other words, in this case, the PWM frequency control unit 29 generates a triangular wave at the PWM frequency being a fixed high frequency that is not synchronous with an output frequency of the inverter 23 that specifies the rotational speed of the motor 14 and with the rotational speed of the motor 14.

Figure 4B:
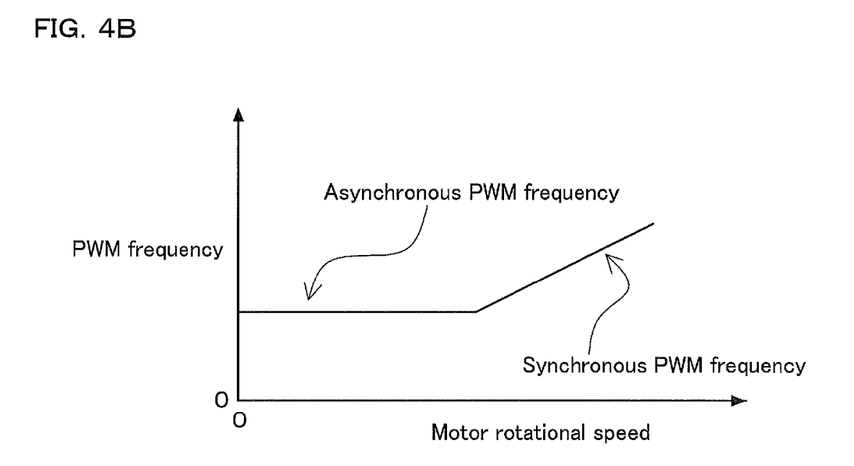
FIG. 4B is a graph illustrating processing performed in the aircraft motor drive control apparatus shown in FIG. 2.

If the low PWM frequency command signal is input as the PWM frequency control signal, the PWM frequency control unit 29 controls the PWM frequency so that asynchronous PWM control is performed if the rotational speed of the motor 14 is below a predetermined rotational speed, and synchronous PWM control is performed if the rotational speed of the motor 14 is higher than or equal to the predetermined rotational speed, as shown in FIG. 4B. In other words, in this case, the PWM frequency control unit 29 generates a triangular wave at the PWM frequency being a fixed low frequency that is not synchronous with an output frequency of the inverter 23 and with the rotational speed of the motor 14 if the rotational speed of the motor 14 is below the predetermined rotational speed. On the other hand, if the rotational speed of the motor 14 becomes higher than or equal to the predetermined rotational speed, the PWM frequency control unit 29 generates a triangular wave at the PWM frequency being a low frequency that is synchronous with the output frequency of the inverter 23 and with the rotational speed of the motor 14.

The PWM frequency control unit 29 is also configured to, for example, adjust the control gain of the control loop for the speed control unit 26 and the current and voltage control unit 27 when performing control for changing the PWM frequency. The PWM frequency control unit 29 is configured to shift the PWM frequency to a newly switched PWM frequency while incrementing or decrementing the PWM frequency when, for example, switching between the PWM frequency control based on the high PWM frequency command signal and the PWM frequency control based on the low PWM frequency command signal.

As described above, according to the present embodiment, the PWM frequency command signal is transmitted from the flight controller 3 to the motor drive control apparatus 2. The flight controller 3 can transmit either the first PWM frequency command signal or the second PWM frequency command signal as the PWM frequency command signal in accordance with the situation of the aircraft. For example, the flight controller 3 can transmit the first PWM frequency command signal in a situation where high response and high-speed rotation of the motor are seldom required, as in a state where the flight condition of the aircraft is stable. Furthermore, the flight controller 3 can transmit the second PWM frequency command signal if a situation occurs where high responses, high-speed rotation, and high output of the motor 14 are highly required when high-output driving is necessary at the time of or after activation, as in a situation where the flight condition of the aircraft is likely to change suddenly depending on the weather or air current conditions, a situation where the aircraft takes off or lands, or a situation where a sudden trouble has occurred.

In the motor drive control apparatus 2, if the first PWM frequency command signal is received, the PWM frequency is controlled so that synchronous PWM control or asynchronous PWM control is performed at a PWM frequency in the predetermined frequency range. Therefore, by setting the predetermined frequency range to low frequencies, the PWM frequency is set to be a low frequency in the situation where high response of the motor 14 is seldom required. Consequently, a loss in the switching element can be appropriately reduced to the extent to which control performance can be ensured in accordance with the situation of the aircraft, and heat generation can be thereby suppressed.

Meanwhile, in the motor drive control apparatus 2, the PWM frequency is controlled at the PWM frequency in the higher frequency range than the above-described predetermined frequency range if the second PWM frequency command signal is received. Therefore, it is possible to ensure sufficient control performance and achieve high response of the motor 14 appropriately in accordance with the situation of the aircraft. Accordingly, because the PWM frequency is efficiently controlled based on the command signal transmitted from the flight controller 3 in accordance with the situation of the aircraft, the motor drive control apparatus 2 is able to ensure control performance and suppress heat generation on a high level in a well-balanced manner. Furthermore, it is thus possible to reduce the size of a heat sink serving as a heat releasing means, and also achieve a further size reduction of the configuration of the motor drive control apparatus 2.

In the motor drive control apparatus 2, the command signal processing unit 25 outputs the high PWM frequency command signal until a predetermined time period elapses after the receipt of the second PWM frequency command signal, and switches the PWM frequency control signal to be output to the low PWM frequency command signal when the predetermined time period has elapsed. Therefore, the PWM frequency is set to a low frequency after a lapse of the predetermined time period even if the amount of heat generation has increased due to unsteady operational conditions in the case where the second PWM frequency command signal has been transmitted from the flight controller 3 because of the situation where high response, high-speed rotation, and high output of the motor 14 are highly required. It is thus possible to reduce a loss in the switching element to suppress heat generation, and achieve a protective function that allows the motor 14 to continue to operate while suppressing temperature rise, without stopping the operation of the motor 14 to protect the motor drive control apparatus 2.

Accordingly, according to the present embodiment, it is possible to provide the aircraft motor drive control apparatus 2 and the motor drive control system 1 that are used for drive control of the motor 14 for driving the backup hydraulic pump 12 that is a device whose required operational state changes depending on the situation of the aircraft, and that are capable of efficiently ensuring control performance and suppressing heat generation on a high level in a well-balanced manner, reducing the size of the configuration, and further achieving a protective function that allows the motor 14 to continue to operate while suppressing temperature rise even if the amount of heat generation rises due to unsteady operational conditions.

Furthermore, according to the present embodiment, the command signal processing unit 25 outputs the high PWM frequency command signal after receiving the second PWM frequency command signal, and switches the PWM frequency command signal to be output to the low PWM frequency command signal when the predetermined time period has elapsed. However, even before the predetermined time period elapses, the command signal processing unit 25 switches the PWM frequency control signal to be output to the low PWM frequency command signal if it has received the upper-limit temperature determination signal. Therefore, even before the predetermined time elapses in the case where the second PWM frequency command signal has been transmitted from the flight controller 3 because of the situation where high response, high-speed rotation, and high output of the motor 14 are highly required, the PWM frequency is set to a low frequency if the amount of heat generation rises due to unsteady operational conditions, and heat generation is thereby suppressed. It is thus possible to further enhance the protective function that allows the motor 14 to continue to operate while suppressing temperature rise, without stopping the operation of the motor 14 to protect the motor drive control apparatus 2.

Furthermore, according to the present embodiment, the command signal processing unit 25 outputs the high PWM frequency command signal after receiving the second PWM frequency command signal, and switches the PWM frequency control signal to be output to the low PWM frequency command signal when the predetermined time period has elapsed. The command signal processing unit 25 also switches the PWM frequency control signal to be output to the low PWM frequency command signal even before the predetermined time period elapses if it has received the upper-limit temperature determination signal. However, even in this state, if the current and voltage control unit 27 has received the upper-limit temperature determination signal, the current and voltage control unit 27 reduces current supplied to the motor 14. Therefore, even if the upper-limit temperature determination signal has been received before the predetermined time period elapses in the case where the second PWM frequency command signal has been transmitted from the flight controller 3 because of the situation where high response, high-speed rotation, and high output of the motor 14 are highly required, the current supplied to the motor 14 is reduced if the upper-limit temperature determination signal is received again because the amount of temperature rose due to unsteady operational conditions, and heat generation is thereby suppressed. It is thus possible to further enhance, on a higher level, the protective function that allows the motor 14 to continue to operate while suppressing temperature rise, without stopping the operation of the motor 14 to protect the motor drive control apparatus 2.

Although an embodiment of the present invention has been described thus far, the present invention is not limited to the embodiment described above, and various modifications may be made within the scope recited in the claims. For example, the following modifications can be made for implementation.

(1) Although the above embodiment has been described, taking the backup hydraulic pump as an example of a device driven by the motor whose drive control is performed by the motor drive control apparatus and the motor drive control system of the present invention, this need not be the case. In other words, the present invention may be applied to a motor drive control apparatus and a motor drive control system that perform drive control of a motor for driving any device other than the backup hydraulic pump.

For example, in the case where a hydraulic pump in an aircraft central hydraulic power source is configured as an electrically powered hydraulic pump driven by a motor, the present invention may be applied to a motor drive control apparatus that performs drive control of the motor for driving this hydraulic pump serving as a device installed in the aircraft. Alternatively, in the case where an actuator for driving a moving surface is configured as an electric actuator, the present invention may be applied to a motor drive control apparatus and a motor drive control system that perform drive control of a motor for driving the electric actuator serving as a device installed in the aircraft. Alternatively, the present invention may be applied to a motor drive control apparatus that performs drive control of a motor for driving a leg (a mechanism supporting the body of an aircraft on the ground) such as a landing gear (undercarriage) serving as a device installed in the aircraft.

Figure 5:
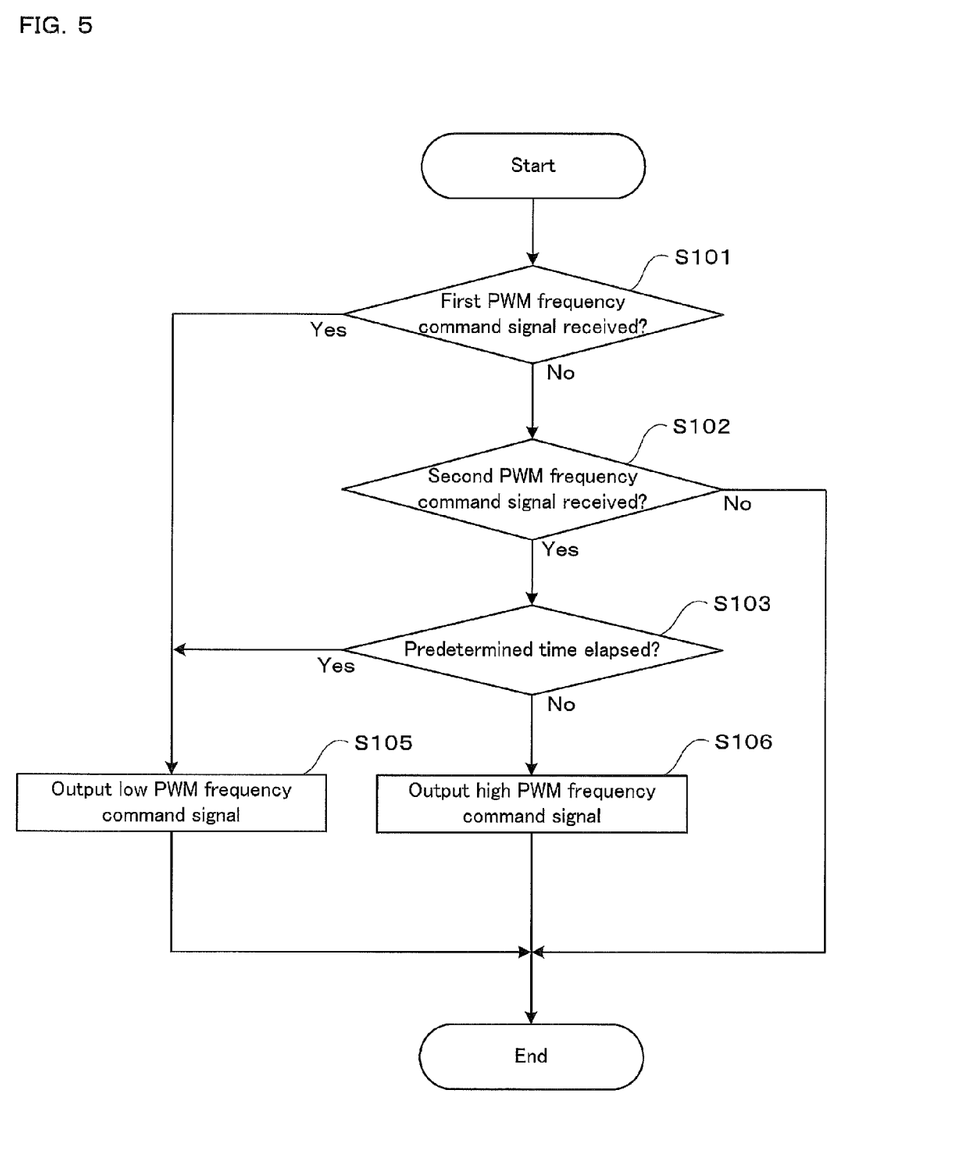
FIG. 5 is a flowchart illustrating processing performed in an aircraft motor drive control apparatus according to a modification.

(2) The above embodiment has been described, taking, as an example, a mode in which, as shown in the flowchart of FIG. 3, it is determined whether or not the upper-limit temperature determination signal has been received from the upper-limit temperature determination unit 31 (step S104) if it is determined that the time period that has passed after the receipt of the second PWM frequency command has not reached the predetermined time period signal without receipt of the first PWM frequency command signal (step S103, No). However, this need not be the case. FIG. 5 is a flowchart illustrating processing performed at the command signal processing unit 25 in the motor drive control apparatus 2 according to a modification.

With the processing according to the modification shown in FIG. 5, at the command signal processing unit 25 the processing in step S104 is not performed, but steps S101 to S103, S105, and S106 are performed. In other words, with the processing according to the modification shown in FIG. 5, if it is determined in step S103 that the time period that has passed after the receipt of the second PWM frequency command signal has not reached the above-described predetermined time period without receipt of the first PWM frequency command signal (step S103, No), the high PWM frequency command signal is output as the PWM frequency control signal (step S106).

In the case where the processing according to the modification shown in FIG. 5 is performed at the command signal processing unit 25, the upper-limit temperature determination signal from the upper-limit temperature determination unit 31 is not used for the determination at the command signal processing unit 25. However, in this case, the current and voltage control unit 27 constitutes a current control unit in the present embodiment for controlling the current supplied to the motor 14 by the inverter 23. If the current and voltage control unit 27 has received the upper-limit temperature determination signal, it reduces the current supplied to the motor 14 by the inverter 23.

According to the above-described modification, the command signal processing unit 25 outputs the high PWM frequency command signal after receiving the second PWM frequency command signal, and switches the PWM frequency control signal to be output to the low PWM frequency command signal when the predetermined time period has elapsed. However, even before the predetermined time period elapses, the current and voltage control unit 27 reduces the current supplied to the motor 14 if the current and voltage control unit 27 has received the upper-limit temperature determination signal. Therefore, even before the predetermined time elapses in the case where the second PWM frequency command signal has been transmitted from the flight controller 3 because of the situation where high response, high-speed rotation, and high output of the motor 14 are highly required, the current supplied to the motor 14 is reduced if the amount of heat generation rises due to unsteady operational conditions, and heat generation is thereby suppressed. It is thus possible to further enhance the protective function that allows the motor 14 to continue to operate while suppressing temperature rise, without stopping the operation of the motor 14 to protect the motor drive control apparatus 2.

Figure 6:
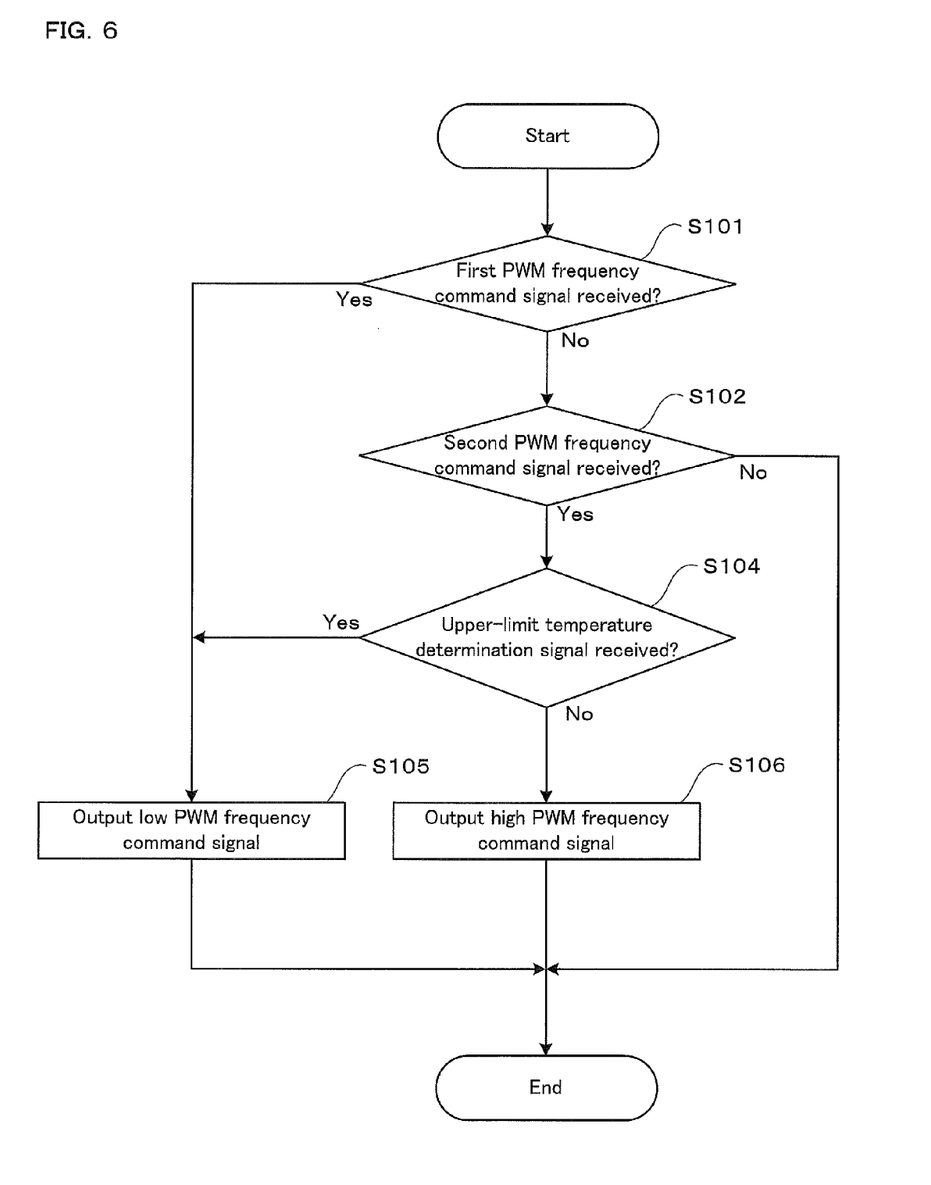
FIG. 6 is a flowchart illustrating processing performed in an aircraft motor drive control apparatus according to a modification.

(3) The above embodiment has been described taking, as an example, a mode in which, as shown in the flowchart of FIG. 3, it is determined whether or not the time period that has passed after the receipt of the second PWM frequency command signal has reached the above-described predetermined time period without receipt of the first PWM frequency command signal (step S103) if the second PWM frequency command signal has been received (step S102, Yes). However, this need not be the case. FIG. 6 is a flowchart illustrating processing performed at the command signal processing unit 25 in the motor drive control apparatus 2 according to a modification.

With the processing according to the modification shown in FIG. 6, at the command signal processing unit 25 the processing in step S103 is not performed, but steps S101, S102, and S104 to S106 are performed. Therefore, the command signal processing unit 25 outputs the high PWM frequency command signal as the PWM frequency control signal if it has received the second PWM frequency command signal but does not receive the upper-limit temperature determination signal. On the other hand, the command signal processing unit 25 outputs the low PWM frequency command signal as the PWM frequency control signal if it has received the second PWM frequency command signal and also received the upper-limit temperature determination signal.

Accordingly, with the processing according to the modification shown in FIG. 6, if it is determined that the second PWM frequency command signal has been received (step S102, Yes), it is determined next whether or not the upper-limit temperature determination signal has been received from the upper-limit temperature determination unit 31 (step S104). If it is determined that the upper-limit temperature determination signal has been received (step S104, Yes), the low PWM frequency command signal is output as the PWM frequency control signal (step S105). On the other hand, if it is determined that the upper-limit temperature determination signal has not been received (step S104, No), the high PWM frequency command signal is output as the PWM frequency control signal (step S106).

Furthermore, in the modification in which the processing shown in FIG. 6 is performed at the command signal processing unit 25 as well, the current and voltage control unit 27 constitutes a current control unit in the present embodiment for controlling the current supplied to the motor 14 by the inverter 23. If this current and voltage control unit 27 receives the upper-limit temperature determination signal while the PWM frequency control unit 29 is controlling the PWM frequency based on the low PWM frequency command signal output by the command signal processing unit 25 after receiving the upper-limit temperature determination signal, the current and voltage control unit 27 reduces the current supplied to the motor 14 by the inverter 23.

According to the above-described modification, because the PWM frequency is efficiently controlled based on the command signal transmitted from the flight controller 3 in accordance with the situation of the aircraft as with the above-described embodiment, it is possible to ensure control performance and suppress heat generation on a high level in a well-balanced manner. Furthermore, it is thus possible to reduce the size of a heat sink serving as a heat releasing means, and achieve a further size reduction of the configuration of the motor drive control apparatus 2.

In the above-described modification, the command signal processing unit 25 outputs the high PWM frequency command signal if it has received the second PWM frequency command signal but has not received the upper-limit temperature determination signal, while the command signal processing unit 25 switches the PWM frequency control signal to be output to the PWM frequency command signal if it has received the upper-limit temperature determination signal. Therefore, the PWM frequency is set to a low frequency if the amount of heat generation increases due to unsteady operational conditions in the case where the second PWM frequency command signal has been transmitted from the flight controller 3 because of the situation where high response, high-speed rotation, and high output of the motor 14 are highly required. It is thus possible to reduce a loss in the switching element to suppress heat generation, and achieve a protective function that allows the motor 14 to continue to operate while suppressing temperature rise, without stopping the operation of the motor 14 to protect the motor drive control apparatus 2.

Accordingly, according to the above-described modification, it is possible to provide the motor drive control apparatus 2 that is used for drive control of the motor 14 for driving a device whose required operational state changes depending on the situation of the aircraft, capable of efficiently ensuring control performance and suppressing heat generation on a high level in a well-balanced manner, reducing the size of the configuration, and further achieving a protective function that allows the motor 14 to continue to operate while suppressing temperature rise even if the amount of heat generation rises due to unsteady operational conditions.

Furthermore, according to the above-described modification, the command signal processing unit 25 outputs the high PWM frequency command signal after receiving the second PWM frequency command signal, and switches the PWM frequency control signal to be output to the low PWM frequency command signal if it has received the upper-limit temperature determination signal. However, if, in this state, the current and voltage control unit 27 has received the upper-limit temperature determination signal, the current and voltage control unit 27 reduces the current supplied to the motor 14. Therefore, even if the upper-limit temperature determination signal has been received in the case where the second PWM frequency command signal has been transmitted from the flight controller 3 because of the situation where high response, high-speed rotation, and high output of the motor 14 are highly required, the current supplied to the motor 14 is reduced if the upper-limit temperature determination signal is received again because the amount of heat generation rises due to unsteady operational conditions, and heat generation is thereby suppressed. It is thus possible to further enhance the protective function that allows the motor 14 to continue to operate while suppressing temperature rise, without stopping the operation of the motor 14 to protect the motor drive control apparatus 2.

The present invention can be widely applied to aircraft motor drive control apparatuses and aircraft motor drive control systems that drive motors mounted in aircrafts to drive devices installed in the aircrafts, and controlling the operational status of the motors. The present invention is not limited to the above-described embodiment, and all modifications, applications and equivalents thereof that fall within the claims, for which modifications and applications would become apparent by reading and understanding the present specification, are intended to be embraced therein.

What is claimed is:

1. An aircraft motor drive control apparatus for driving a motor mounted in an aircraft to drive a device installed in the aircraft, and controlling an operational status of the motor, comprising:
   an inverter that has a switching element and drives the motor; and
   a control unit that performs pulse width modulation control of the inverter,
   the control unit including:
   a command signal processing unit that outputs a PWM frequency control signal for controlling a PWM frequency, which is a switching frequency in the switching element, based on a signal from a controller that generates a PWM frequency command signal for specifying the PWM frequency; and
   a PWM frequency control unit that controls the PWM frequency based on the PWM frequency control signal,
   wherein the command signal processing unit receives, as the PWM frequency command signal, one of a first PWM frequency command signal and a second PWM frequency command signal,
   if the command signal processing unit has received the first PWM frequency command signal, the command signal processing unit outputs, as the PWM frequency control signal, a low PWM frequency command signal for causing the PWM frequency control unit to control the PWM frequency so that synchronous PWM control or asynchronous PWM control is performed at the PWM frequency in a predetermined frequency range,
   if the command signal processing unit has received the second PWM frequency command signal, and until a time period that has passed after the receipt of the second PWM frequency command signal reaches a predetermined time period without receipt of the first PWM frequency command signal, the command signal processing unit outputs, as the PWM frequency control signal, a high PWM frequency command signal for causing the PWM frequency control unit to control the PWM frequency so that synchronous PWM control or asynchronous PWM control is performed at the PWM frequency in a higher frequency range than the predetermined frequency range, and
   if the command signal processing unit has received the second PWM frequency command signal and the time period that has passed without receipt of the first PWM frequency command signal after the receipt of the second PWM frequency command signal has reached the predetermined time, the command signal processing unit outputs, as the PWM frequency control signal, the low PWM frequency command signal.

2. The aircraft motor drive control apparatus according to claim 1,
further comprising a temperature measurement unit that measures a temperature of the inverter,
wherein the control unit has an upper-limit temperature determination unit that calculates a temperature change per unit time based on a result of temperature measurement at the temperature measurement unit, and outputs an upper-limit temperature determination signal to the command signal processing unit if the upper-limit temperature determination unit determines that the temperature will reach a predetermined upper-limit temperature, and
the command signal processing unit outputs, as the PWM frequency control signal, the low PWM frequency command signal if the command signal processing unit has received the second PWM frequency command signal, and until the time period that has passed after the receipt of the second PWM frequency command signal reaches the predetermined time period without receipt of the first PWM frequency command signal, and further, if the command signal processing unit has received the upper-limit temperature determination signal.

3. The aircraft motor drive control apparatus according to claim 2,
wherein the control unit includes a current control unit that controls a current supplied to the motor by the inverter,
the upper-limit temperature determination unit outputs the upper-limit temperature determination signal also to the current control unit, and
the current control unit reduces the current supplied to the motor by the inverter if the current control unit receives the upper-limit temperature determination signal while the PWM frequency control unit is controlling the PWM frequency based on the low PWM frequency command signal output by the command signal processing unit after receiving the upper-limit temperature determination signal.

4. The aircraft motor drive control apparatus according to claim 1,
further comprising a temperature measurement unit that measures a temperature of the inverter,
wherein the control unit includes:
a current control unit that controls a current supplied to the motor by the inverter; and
an upper-limit temperature determination unit that calculates a temperature change per unit time based on a result of temperature measurement at the temperature measurement unit, and outputs an upper-limit temperature determination signal to the current control unit if the upper-limit temperature determination unit determines that the temperature will reach a predetermined upper-limit temperature, and
the current control unit reduces the current supplied to the motor by the inverter if the current control unit has received the upper-limit temperature determination signal.

5. An aircraft motor drive control apparatus for driving a motor mounted in an aircraft to drive a device installed in the aircraft, and controlling an operational status of the motor, comprising:
an inverter that has a switching element and drives the motor;
a control unit that performs pulse width modulation control of the inverter, and
a temperature measurement unit that measures a temperature of the inverter,
the control unit including:
a command signal processing unit that outputs a PWM frequency control signal for controlling a PWM frequency, which is a switching frequency in the switching element, based on a signal from a controller that generates a PWM frequency command signal for specifying the PWM frequency;
a PWM frequency control unit that controls the PWM frequency based on the PWM frequency control signal; and
an upper-limit temperature determination unit that calculates a temperature change per unit time based on a result of temperature measurement at the temperature measurement unit, and outputs an upper-limit temperature determination signal to the command signal processing unit if the upper-limit temperature determination unit determines that the temperature will reach a predetermined upper-limit temperature,
wherein the command signal processing unit receives, as the PWM frequency command signal, one of a first PWM frequency command signal and a second PWM frequency command signal,
if the command signal processing unit has received the first PWM frequency command signal, the command signal processing unit outputs, as the PWM frequency control signal, a low PWM frequency command signal for causing the PWM frequency control unit to control the PWM frequency so that synchronous PWM control or asynchronous PWM control is performed at the PWM frequency in a predetermined frequency range,
if the command signal processing unit has received the second PWM frequency command signal but has not received the upper-limit temperature determination signal, the command signal processing unit outputs, as the PWM frequency control signal, a high PWM frequency command signal for causing the PWM frequency control unit to control the PWM frequency so that synchronous PWM control or asynchronous PWM control is performed at the PWM frequency in a higher frequency range than the predetermined frequency range, and
if the command signal processing unit has received the second PWM frequency command signal and also received the upper-limit temperature determination signal, the command signal processing unit outputs, as the PWM frequency control signal, the low PWM frequency command signal.

6. The aircraft motor drive control apparatus according to claim 5,
wherein the control unit includes a current control unit that controls a current supplied to the motor by the inverter,
the upper-limit temperature determination unit outputs the upper-limit temperature determination signal also to the current control unit, and
the current control unit reduces the current supplied to the motor by the inverter if the current control unit receives the upper-limit temperature determination signal while the PWM frequency control unit is controlling the PWM frequency based on the low PWM frequency command signal output by the command signal processing unit after receiving the upper-limit temperature determination signal.

* * * * *